D. N. MacRAE.
AEROPLANE.
APPLICATION FILED APR. 22, 1921.

1,409,305.

Patented Mar. 14, 1922.

Inventor
D. N. MacRae
By
Attorney

UNITED STATES PATENT OFFICE.

DUNCAN NORMAN MacRAE, OF MAXVILLE, ONTARIO, CANADA.

AEROPLANE.

1,409,305. Specification of Letters Patent. Patented Mar. 14, 1922.

Application filed April 22, 1921. Serial No. 463,655.

*To all whom it may concern:*

Be it known that I, DUNCAN NORMAN MACRAE, a British subject, residing at Maxville, in the Province of Ontario, in the Dominion of Canada, have invented certain new and useful Improvements in Aeroplanes; and I do hereby declare that the following is a full, clear, and exact description of the same.

The present invention relates to improvements in aeroplanes, and its main object is to provide means of lifting a machine of this character vertically from the ground, thus eliminating large starting grounds or spaces.

A further object of this invention is to provide a machine of this character of simple construction that will be easily operated.

To have a better understanding of the invention reference should be had to the accompanying drawings which form part of this application, and in which.

Like numerals of reference indicate corresponding parts in each figure.

Referring to the drawings:—

Figure 1:
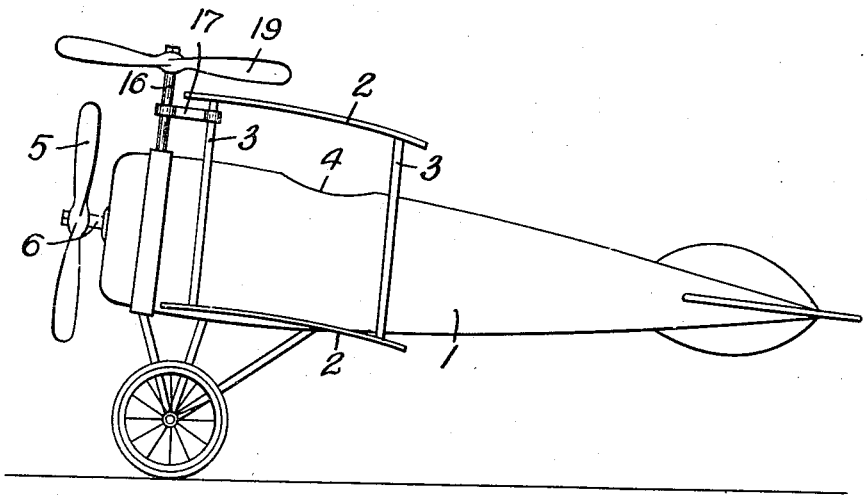
Figure 1 is a side elevation of an aeroplane provided with the invention.
Figure 2:
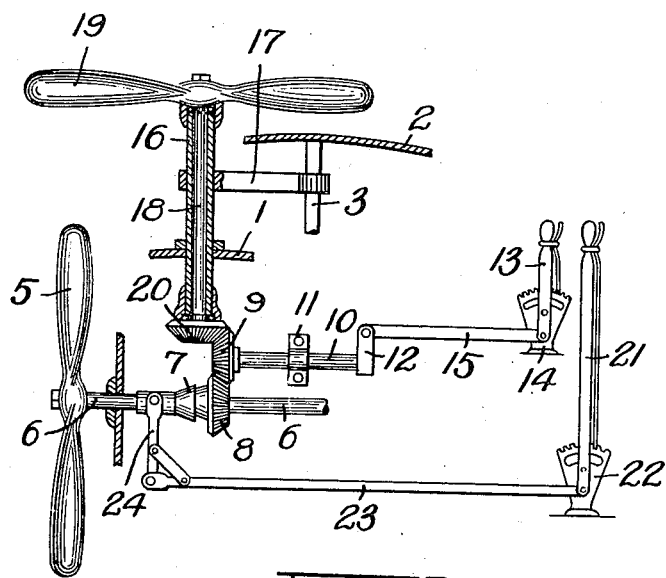
Figure 2 is an enlarged detail view of the driving mechanism, a portion only of the body of the aeroplane being shown.

1 indicates the body portion of an aeroplane and 2 are the wings which are suitably supported by the posts 3. In the body 1, is provided the usual cockpit 4, and 5 is the usual propeller mounted on the crank shaft 6 of the engine which is not illustrated in the drawings. The said crank shaft 6 is preferably divided in two portions, and on one of said portions is secured the male member of a clutch 7, and the female member is secured on the other portion of said shaft.

Mounted on said shaft 6 is a bevelled gear 8 which co-acts with the intermediate movable bevelled gear 9 mounted on the slidable shaft 10. The said shaft 10 is mounted in the bracket 11 and is provided at one end with a lug 12. Adjacent said shaft 10 is provided the lever 13 mounted on the quadrant 14 and 15 is a connecting rod secured at one end to the lower end of said lever 13 and at its other end to the lug 12. By operating said lever 13 the gear 9 will be shifted in or out of contact with the bevelled gear 8. The lever 13 is preferably secured in the cockpit 4 near the seat of the pilot.

Suitably secured in the frame or body of the machine, preferably at a vertical angle to said body, is a tubular member 16 which projects above said frame and the upper wing, and 17 is a bracket or brace secured at one end to the post 3 and at its other end to the said tubular member. In said tubular member is provided a shaft 18 having at its upper end the propeller 19 conveniently secured thereto and at its lower end the bevelled pinion 20 which is adapted to co-act with the gear 9.

The clutch 7 is preferably operated by the lever 21 mounted on the quadrant 22 and connected to said clutch by means of the rod 23 and fork member 24. When the propeller 5 is in operation, the clutch member 7 is put on, and the gear 9 is shifted out of contact with the gear 8 and pinion 20. To operate the propeller 19, the clutch 7 is withdrawn from contact by the lever 21 and the lever 13 is operated to shift said gear 9 into engagement with the pinion 20 and gear 18.

It will readily be seen that both propellers can be operated simultaneously and independently as the case may be.

What I claim as my invention is:

1. In an aeroplane, in combination with the crank shaft of the engine having a propeller mounted thereon; a bevelled gear mounted on said crank shaft; a shaft mounted at right angle in relation to said crank shaft; a bevelled pinion mounted at the lower end of said shaft; a propeller mounted at the upper end of said shaft; and intermediate movable bevelled gear adapted to co-act with said pinion and said bevelled gear on said crank shaft; means to move said intermediate gear in or out of contact with said pinion on said shaft and gear on said crank shaft; and a clutch on said crank shaft to disconnect the propeller mounted thereon, substantially as described.

2. In an aeroplane, in combination with the frame, wings, cockpit, engine, crank shaft, and propeller; a bevelled gear mounted on said crank shaft, a vertical tubular member secured in the body of said aeroplane; a bracket adapted to secure said tubular member, said bracket being secured to the posts supporting the wings; a shaft adapted to project through said tubular member; a propeller mounted on the upper end of said shaft, said propeller being adapted to project above the wings; a bevelled pinion mounted at the lower end of said shaft; an intermediate movable bevelled gear adapted to co-act with said pinion and said bevelled gear mounted on said crank shaft; means in said cockpit to operate said intermediate bevelled gear; clutch mounted intermediate of said bevelled gear and propeller on said crank shaft; and means in said cockpit to operate said clutch, substantially as described.

Signed at Maxville, Ontario, Canada this 24th day of March 1921.

DUNCAN NORMAN MacRAE.

Witnesses:
MARY ANN STEWART,
ALEX H. ROBERTSON.